United States Patent
Prokhorov

(10) Patent No.: US 8,705,849 B2
(45) Date of Patent: Apr. 22, 2014

(54) METHOD AND SYSTEM FOR OBJECT RECOGNITION BASED ON A TRAINABLE DYNAMIC SYSTEM

(75) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1136 days.

(21) Appl. No.: 12/276,703

(22) Filed: Nov. 24, 2008

(65) Prior Publication Data

US 2010/0128975 A1 May 27, 2010

(51) Int. Cl.
*G06K 9/62* (2006.01)

(52) U.S. Cl.
USPC .......................................... 382/155; 348/169

(58) Field of Classification Search
USPC .................. 382/100, 103, 104, 105, 106, 107, 382/155–159, 181, 190, 195, 201; 348/135, 348/143, 169–172
See application file for complete search history.

(56) References Cited

U.S. PATENT DOCUMENTS

| 5,740,274 | A | * | 4/1998 | Ono et al. | 382/190 |
|---|---|---|---|---|---|
| 6,014,601 | A | | 1/2000 | Gustafson | |
| 6,208,758 | B1 | * | 3/2001 | Ono et al. | 382/190 |
| 6,301,003 | B1 | | 10/2001 | Shirai et al. | |
| 6,728,404 | B1 | * | 4/2004 | Ono et al. | 382/190 |
| 7,000,721 | B2 | | 2/2006 | Sugawara et al. | |
| 7,046,841 | B1 | * | 5/2006 | Dow et al. | 382/154 |
| 7,202,776 | B2 | | 4/2007 | Breed | |
| 7,706,612 | B2 | * | 4/2010 | Luo | 382/181 |
| 2004/0258313 | A1 | * | 12/2004 | Jones et al. | 382/224 |
| 2006/0155427 | A1 | * | 7/2006 | Yang | 701/1 |
| 2007/0005525 | A1 | * | 1/2007 | Collette et al. | 706/15 |
| 2008/0046150 | A1 | * | 2/2008 | Breed | 701/45 |

OTHER PUBLICATIONS

Kouba et al. (SPIE, vol. 1965 Applications of Artificial Neural Networks IV, year 1993, pp. 256-266).*
*Training Recurrent Neurocontrollers for Robustness With Derivative-Free Kalman Filter*, Danil V. Prokhorov; IEEE Transactions on Neural Networks, vol. 17, No. 6, Nov. 2006.

* cited by examiner

*Primary Examiner* — Anand Bhatnagar
(74) *Attorney, Agent, or Firm* — Gifford, Krass, Sprinkle, Anderson & Citkowski, P.C.

(57) ABSTRACT

A system for object recognition in which a multi-dimensional scanner generates a temporal sequence of multi-dimensional output data of a scanned object. That data is then coupled as an input signal to a trainable dynamic system. The system exemplified by a general-purpose recurrent neural network is previously trained to generate an output signal representative of the class of the object in response to a temporal sequence of multi-dimensional data.

3 Claims, 2 Drawing Sheets

METHOD AND SYSTEM FOR OBJECT RECOGNITION BASED ON A TRAINABLE DYNAMIC SYSTEM

BACKGROUND OF THE INVENTION

I. Field of the Invention

The present invention relates generally to a system and method for object recognition and, more particularly, to such a method and system using a neural network.

II. Description of Related Art

There are many previously known systems for object recognition. Such systems typically utilize a camera to take a two-dimensional view of the object and then process the data in that view in an attempt to identify the object or the position of the object. Such systems oftentimes use one or more microprocessors to process the data.

Although the processing capabilities of microprocessors have increased dramatically in recent years, the processing of the image captured by the camera or other suitable sensor for these previously known object recognition systems is still computationally demanding.

There have been previously known systems which utilize a neural network to process the image captured by the camera or other suitable sensor in such object recognition systems. The image is usually fed into the algorithm as a collection of features, e.g., pixel intensities. The temporal order of such features is meaningless in the context of the single image. More importantly, the number of features can be very large, making the task of object recognition computationally very demanding.

A still further shortcoming of these previously known object recognition systems is that such systems were unable to perform reliable rotational invariant recognition of objects. In many situations, however, the precise orientation of the object desired to be recognized is unknown and will vary from one object to the next, making the object recognition a very challenging task. That is also true where object recognition is employed in an automotive vehicle for objects outside the vehicle.

SUMMARY OF THE PRESENT INVENTION

The present invention provides both a method and system for object recognition which overcomes the above-mentioned disadvantages of the previously known methods and systems.

In brief, a multi-dimensional lidar is employed which generates a temporal sequence of multi-dimensional output data of a scanned object. In practice, such two- or three-dimensional scanners (lasers employing rotating heads, oscillating mirrors or other designs, of which laser is a representative of) are capable of producing thousands of scanned data points for a scanned object per second. Temporal sequences formed by such data points are generally different for different objects (temporal signatures of objects) presenting an opportunity to distinguish them for a sufficiently powerful signal processing system.

The three-dimensional output data from the scanner are then fed as input signals to a trainable dynamic system, such as a recurrent neural network. This neural network, furthermore, has been previously trained to generate an output signal representative of the class of the object. At a minimum, there are two classes, but multiple classes for different types of objects may also be utilized. In order to provide object recognition for the class of the object at different rotational positions of the object, the neural network is trained to identify the class of the object at different rotational positions of the object. Preferably, the different rotational positions of the object are at predetermined angular increments, such as ten degrees, so that the class of the object may be identified regardless of its rotational position.

In order to perform such training for rotational invariance, preferably the neural network is trained simultaneously for each angular segment of the rotation of the object by creating plural copies of the neural network and in which each copy is trained on a different angular segment.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
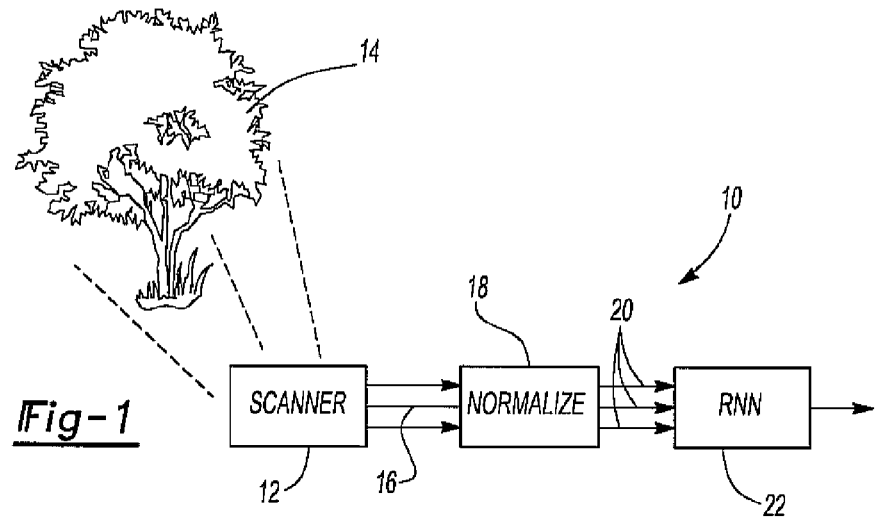
FIG. 1 is a block diagrammatic view illustrating a preferred embodiment of the present invention.

With reference first to FIG. 1, a preferred embodiment of an object recognition system 10 in accordance with the present invention is shown. A three-dimensional scanner 12 scans an object 14 and generates a temporal sequence of three-dimensional output data on its output 16 representative of the scanned object 14. The preferred scanner 12 is a three-dimensional laser scanner which generates thousands of output data per second representative of the scanned object 14. Other types of multi-dimensional (two- or higher-dimensional) scanners, however, may be utilized without deviation from the spirit or scope of the invention.

The data from the scanner output 16 is fed as an input signal to a normalizing means 18 which normalizes the data to facilitate processing of the data. The normalizing means 18 may comprise a separate circuit but, more typically, the normalization means is performed by software utilizing processors, such as microprocessors or other types of data processors. Furthermore, any normalization routine may be used such as:

$$\frac{x(t) - Xmean}{STDx}$$

where x(t)=temporal data
Xmean=mean of X
STDx=standard deviation of x

Figure 2:
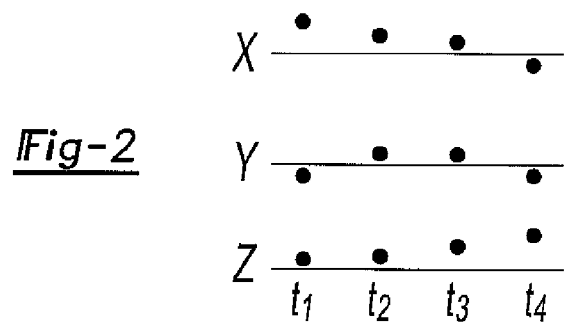
FIG. 2 is an exemplary data output from the scanner.

With reference now to FIG. 2, the output from the scanner is illustrated for a very short segment of time. For example, at time $t_1$, the data for X, Y and Z, i.e. the three-dimensional Cartesian coordinates, are simultaneously coupled as input signals to the normalizing means 18. This is repeated at time $t_2$-$t_n$ such that a temporal sequence of three-dimensional output data from the scanner 12 is processed by the normalizing means 18. Other coordinate systems (e.g., spherical) may be utilized without deviation from the spirit or scope of the invention.

Similar normalization will also be performed on the Y and Z data from the scanner 12.

Figure 3:
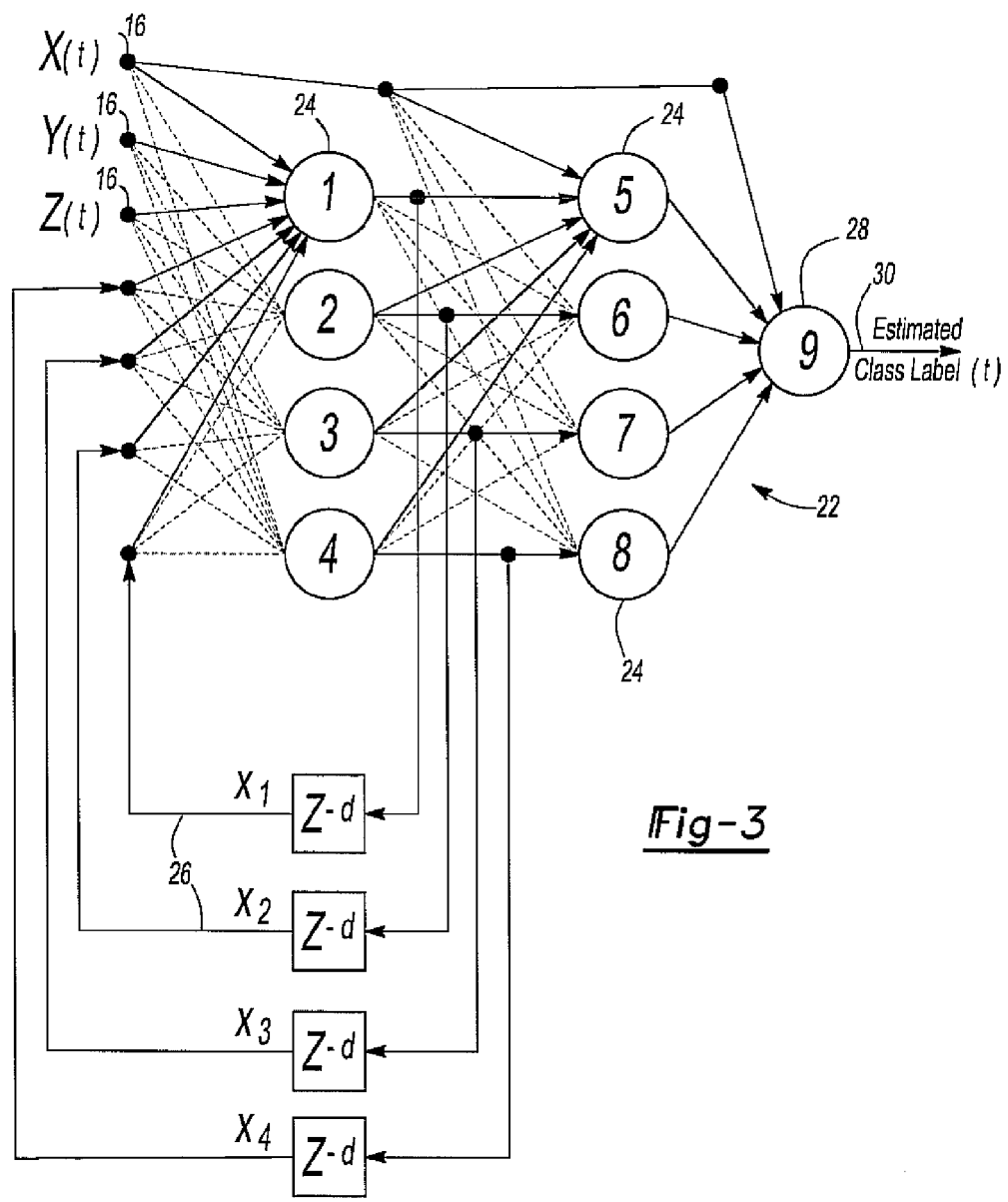
FIG. 3 is an exemplary recurrent neural network to process the data from the scanner.

Referring again to FIG. 1, the normalized X, Y and Z data from the normalizing means 18 on output lines 20 are coupled as input signals to a recurrent neural network 22. The neural network 22, furthermore, is typically implemented in software such as shown in FIG. 3. An exemplary recurrent neural network is shown in FIG. 3.

With reference then to FIG. 3, the outputs 16 from the scanner 12 which contain the temporal sequence of X, Y and Z data are coupled as input signals to the neural network 22. The neural network 22 includes a plurality of nodes 24, some of which provide feedback on feedback lines 26. An output node 28 for the neural network 22 then provides an output signal on its output line 30 indicative of the class of the scanned object. There are at least two classes of objects, e.g. a moving object and a stationary object, although the neural network may differentiate between more classes of objects through proper training of the neural network 22.

As with all recurrent neural networks, the recurrent neural network 22 must be trained in order to differentiate between different types of objects. In the preferred form of the invention, this training includes training of The neural network 22 to perform rotational invariance, i.e. identification of the class of the object regardless of the rotational position of the object. In order to train the neural network 22 to perform object recognition with rotational invariance, the data from the scanned object is rotated in preset angular amounts, e.g. ten degrees, and the then rotated three-dimensional data is utilized to train the neural network 22.

The rotation of the three-dimensional data may be rapidly performed by using simple matrix algebra illustrated below for two-dimensional X, Y data (two-dimensional rotation is often sufficient for object recognition in automotive settings) as follows:

$$A = \begin{Bmatrix} \cos(a) & \sin(a) \\ -\sin(a) & \cos(a) \end{Bmatrix}$$

where A=matrix
a=angle of rotation

For example, if the angular rotational segment equals ten degrees, then the data is manipulated 35 times to obtain the rotated data at each ten degree angular segment for the proper training of the neural network 22.

Figure 4:
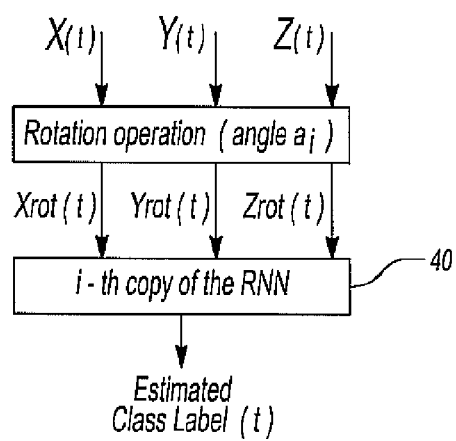
FIG. 4 is a block diagrammatic view illustrating a modification of the present invention.

With reference now to FIG. 4, for most effective training of the recurrent neural network 22, multi-stream training is performed so that the data for each rotated angle is performed simultaneously. In order to do that, multiple copies of the neural network are created so that one copy corresponds to each angular segment. For example, if the angular segment were ten degrees for each rotation, then 36 different copies of the recurrent neural network would be created as shown at 40 in FIG. 4. Using matrix algebra, the data for the X, Y and Z position data at each time is then simultaneously processed by each copy of the recurrent neural network with each copy performing the rotation of the data for that particular copy of the recurrent neural network. In the process of training, the weights of the nodes for the each copy of the recurrent neural network are updated together. The process is repeated until for the final recurrent neural network with satisfactory performance is obtained. An example training method for the neural network is given in D. V. Prokhorov, "Training recurrent neurocontrollers for robustness with derivative-free Kalman filter", IEEE TRANSACTIONS ON NEURAL NETWORKS, VOL. 17, NO. 6, NOVEMBER 2006, pp. 1606-1616.

From the foregoing, it can be seen that the present invention provides a unique system and method for the recognition of the class of an object which utilizes a temporal sequence of multi-dimensional data preferably coupled with rotational invariance. Having described my invention, however, many modifications thereto will become apparent to those skilled in the art to which it pertains without deviation from the spirit of the invention as defined by the scope of the appended claims.

I claim:

1. A system for object recognition comprising:
a multi-dimension distance scanner which generates a temporal sequence of multi-dimensional output data of a scanned object,
a trainable recurrent neural network which receives the temporal sequence of multi-dimensional output data as input data, said trainable recurrent neural network being trained to generate an output signal representative of a class of the scanned object,
wherein said trainable recurrent neural network is trained for rotation invariant recognition of the scanned object,
wherein the trainable recurrent neural network is trained for rotation invariant recognition in preset rotational increments,
wherein the trainable recurrent neural network is trained for rotation invariant recognition simultaneously in all preset rotational increments.

2. The invention as defined in claim 1 and comprising means for normalizing said multi-dimensional output data.

3. A method for object recognition comprising the steps of:
creating a temporal sequence of multi-dimensional output data of a scanned object,
coupling said multi-dimensiional output data as input data to a trainable recurrent neural network previously trained to identify different classes of objects,
wherein said trainable recurrent neural network is trained for rotation invariance,
wherein said trainable recurrent neural network is trained for rotation invariance in preset rotational steps,
wherein said trainable recurrent neural network is trained for rotation invariance simultaneously in all rotational steps.

* * * * *